(12) United States Patent
Knappe et al.

(10) Patent No.: US 8,668,828 B2
(45) Date of Patent: Mar. 11, 2014

(54) SANITARY SPIRAL WOUND FILTRATION CARTRIDGE

(75) Inventors: Peter H. Knappe, Santa Barbara, CA (US); Matthew Tanner, Ventura, CA (US)

(73) Assignee: TriSep Corporation, Goleta, CA (US)

( * ) Notice: Subject to any disclaimer, the term of this patent is extended or adjusted under 35 U.S.C. 154(b) by 855 days.

(21) Appl. No.: 12/324,518

(22) Filed: Nov. 26, 2008

(65) Prior Publication Data

US 2009/0145838 A1    Jun. 11, 2009

Related U.S. Application Data

(60) Provisional application No. 60/992,494, filed on Dec. 5, 2007.

(51) Int. Cl.
*B01D 63/10* (2006.01)
*B01D 61/08* (2006.01)

(52) U.S. Cl.
USPC ............... 210/321.85; 210/321.83; 210/493.4

(58) Field of Classification Search
None
See application file for complete search history.

(56) References Cited

U.S. PATENT DOCUMENTS

| | | | |
|---|---|---|---|
| 4,064,052 A | 12/1977 | Zimmerly | |
| 4,277,340 A * | 7/1981 | Kanamaru et al. | 210/321.83 |
| 4,301,013 A | 11/1981 | Setti et al. | |
| 4,475,973 A * | 10/1984 | Tanaka et al. | 156/184 |
| 4,548,714 A | 10/1985 | Kirwan, Jr. et al. | |
| 4,902,417 A * | 2/1990 | Lien | 210/321.74 |
| 4,906,372 A | 3/1990 | Hopkins | |
| 5,108,604 A | 4/1992 | Robbins | |
| 5,114,852 A * | 5/1992 | Yabusaki et al. | 435/184 |
| 5,128,037 A | 7/1992 | Pearl et al. | |
| 5,192,437 A * | 3/1993 | Chang et al. | 210/321.83 |
| 5,490,926 A | 2/1996 | Hammeken | |
| 5,985,146 A | 11/1999 | Knappe et al. | |
| 6,413,424 B1 | 7/2002 | Shelby | |
| 7,208,088 B2 | 4/2007 | Ahmasian et al. | |
| 7,303,675 B2 | 12/2007 | De La Cruz | |

FOREIGN PATENT DOCUMENTS

JP       2005279377    10/2005
WO   WO 2007/131033   11/2007

* cited by examiner

*Primary Examiner* — Krishnan S Menon
(74) *Attorney, Agent, or Firm* — Fitch, Even, Tabin & Flannery LLP

(57) ABSTRACT

Sanitary elements and cartridges of high performance are described which utilize a thin surrounding tubular shell with an exterior textured surface. Through the use of an overwrap material of particular design and by wrapping an assemblage of sheets of semipermeable membrane material, permeate carrier material and feed spacer material using a high tension, a spirally wound crossflow filtration element is constructed which has a substantially cylindrical outer surface of closely controlled OD that smoothly fits within such shell and which resists telescoping as a result of its radial compression.

9 Claims, 4 Drawing Sheets

SANITARY SPIRAL WOUND FILTRATION CARTRIDGE

CROSS REFERENCE TO RELATED APPLICATIONS

This application claims priority from U.S. provisional application Ser. No. 60/992,494, filed Dec. 5, 2007, the disclosure of which is incorporated herein by reference.

This application relates generally to spiral wound filtration elements made of sheetlike semipermeable membrane material designed for crossflow filtration operation, and more particularly to cartridges incorporating such sanitary elements wherein a controlled bypass of the liquid feed is afforded exterior of the spirally wound element.

BACKGROUND OF THE INVENTION

When spiral wound filtration elements are used in the dairy industry and other food industries, as well as in the pharmaceutical industry, regulations are such that they must regularly be sanitized by flushing with cleaning solutions. The presence of seals, between the exterior surface of such a spirally wound element and the interior of a pressure vessel, within which it is normally operated, creates difficulties in assuring that cleaning is adequately carried out to prevent potential bacterial growth in such regions. As an answer to these problems, there have been a variety of constructions proposed for spiral wound membrane elements wherein a controlled bypass of an appropriate minimum amount is established about the exterior cylindrical surface of the element which renders the use of seals in this region unnecessary. For example, the 1985 patent to Kirwan et al. U.S. Pat. No. 4,548,714 describes a construction where the membrane cartridge utilizes an extension of one leaf of the porous feed carrier sheet which is wrapped about the cylindrical perimeter of the element, and simply taped in place. U.S. Pat. No. 4,301,013 to Setti et al. teaches the use of an open mesh polymeric netting material which is placed as a sock about the cylindrical exterior of the spiral wound membrane to establish a controlled bypass flow therepast of about 4-12 gallons per minute. The 1990 patent to Hopkins U.S. Pat. No. 4,906,372 discloses the use of a seamless, substantially rigid, tubular sleeve within which the spiral wound assembly is snugly received to provide a controlled bypass of feed liquid flow in the pressure vessel which the filtration operation is being carried out. The 1992 patent to Pearl et al., U.S. Pat. No. 5,128,037, employs rigid end plates which are provided with outer peripheral holes to create a controlled bypass in the annular region between the interior surface of the pressure vessel and the exterior surface of a thin shell; the spirally wound element is wrapped with an extended leaf of either permeate material or feed spacer material in the manner of the Kirwan element and tightly fit within the outer shell. The 1996 patent to Hammeken, U.S. Pat. No. 5,490,926, is similar; between the outer cylindrical layer of the spirally wound assemblage and the interior cylindrical surface of the pressure vessel, there is disposed a helical ridge or bead which runs end to end in this region and thus provides for a controlled bypass of feed fluid.

U.S. Pat. No. 5,985,146, which issued in 1999 to Knappe et al., discloses a sanitary spiral wound filtration element which employs a thin shell of polymeric material that is received in a snug, slidable fit within the cylindrical pressure vessel wherein filtration operation is carried out. Whereas this arrangement is an effective one for sanitary elements, the overall performance is dependent upon consistently fabricating the spiral wound element to fit tightly within the thin shell. If there is a rather loose-fitting arrangement, there will be additional bypass along the interior surface of the shell until such time as the assemblage slowly radially expands; however, such expansion will very likely result in the creation of some relatively open passageways directly through the element and thereby result in a potential decrease in performance. Another concern is the potential extrusion of the feed spacer sheeting, known as telescoping, that can result from high differential feed-brine pressures; such can abrade the membrane surface and result in shortened membrane life. It is also possible that, after an element has been in service for a long period of time, the combination of pressurization cycles and fluctuations in temperature can cause compression of the thickness of the membrane material and/or the permeate carrier fabric. Such can result in an enlarged space between the element and the inside of the shell which can lead to the element slipping out of its shell during subsequent cartridge unloading and/or repositioning in the pressure vessel. Thus, improvements to this design which would result in even better sanitary elements have been pursued.

It has now been found that the sanitary cartridges taught in the '146 patent can be improved if the spiral wound elements can be fabricated to a precise outer diameter so that they will snugly fit within the thin-wall outer shell and, as a result, will deter additional liquid bypass adjacent the interior, smooth cylindrical surface of the shell. Moreover, if the element can be maintained in a tightly wound state under high tension, the element will resist "telescoping" expansion and will resist becoming undesirably loose within the rigid shell.

These spiral wound, crossflow filtration elements are generally constructed by the application of bands of adhesive which are located to create a secure envelope that is a 3-ply leaf wherein two sheets of semipermeable membrane material envelop a sheet of permeate carrier material of similar dimension. By sealing three of the four edges of these rectangular sheet subassemblies, 3-ply leaves are created wherein the only path into the permeate carrier sheet is by permeation through the semipermeable membrane material, and the only exit path is via the fourth open edge of the envelopes that lies adjacent the permeate collection tube in the spiral wound assemblage. Because in a production line operation it is not possible to position the crosswise band of adhesive that creates the end seal precisely at the end of all three of the two membrane sheets and the permeate carrier sheet being sandwiched therebetween, there will nearly always be short edge regions of the three sheets that may extend past the crosswise adhesive band. For sanitary elements used in the dairy, food and pharmaceutical processing industries, the U.S. Department of Agriculture (USDA) insists that these end seals be trimmed so that the end edge surfaces of these 3-ply leaves are filled with adhesive and do not have nooks and crannies where bacterial growth might occur. Because the U.S. Food and Drug Administration (FDA)-acceptable adhesives which are used in making the envelopes take some time to cure, it has become a necessary standard production procedure to partially unroll the assemblages some 12-24 hours after initial fabrication of a sanitary element in order to effect such end-edge-trimming of the 3-ply leaves, and then rewind the plurality of leaves to create the final element.

SUMMARY OF THE INVENTION

It has now been found that if, as a part of such a rewinding operation, an overwrap sheet of particular design is incorporated, it will not only facilitate rewinding so as to create a substantially cylindrical element with an outer diameter (OD) within very close tolerances that will then be snugly received within the thin outer shell to complete the cartridge, but that the character of the overwrap sheet employed can be such as to itself deter bypass flow of liquid feed through the cartridge in the region immediately interior of the shell surface. Moreover, when such rewinding is done utilizing a machine that is designed to tension or tighten the element to achieve a specific value during this operation, the result is a robust element construction that is capable of withstanding high differential pressures at high temperatures without telescoping.

There are some filtration applications for sanitary design elements where USDA requirements need not be met; for example, even though the European Union typically follows USDA guidelines, such are not strictly required in this area. It is, therefore, possible to supply sanitary spirally wound elements for European food, dairy, and pharmaceutical applications that do not have the end edges of the 3-ply membrane-permeate carrier fabric leaves trimmed so the edge surfaces are filled with adhesive; however, it is still desirable to have such an element properly tensioned prior to its insertion into a sanitary rigid shell in order to resist telescoping and/or expansion during subsequent operating.

It is desirable that the tension that is created within the element is such that the flanking two membrane sheets become pressed against the feed spacer with a force that is equal to or greater than the force generated within the feed spacer as a result of the differential pressure to resist telescoping. The difference between the feed pressure and the concentrate pressure is the differential that is created as a result of frictional pressure losses from flow of the liquid feed solution from end-to-end through the feed spacer material. To resist this differential pressure force, effective relative radial compression of the feed spacer between the flanking sheets of membrane is established by maintaining tension on one of the leaves that extends throughout the assemblage from the region of the central permeate tube. Effective resistance becomes established when the tensioning force times the coefficient of friction between the feed spacer and the membrane is equal to or preferably greater than the differential pressure times the cross sectional area of the feed spacer. This can be calculated by the following formula:

$$2*\mu*F > \Delta p*a \qquad \text{Formula 1}$$

where
- $\mu$=coefficient of friction between membrane and feed spacer,
- F=force exerted on feed spacer by membrane,
- $\Delta p$=differential pressure on element,
- a=cross sectional area of feed spacer.

Based on our empirical testing and experience in the food and dairy industry, it has been determined that a spirally wound element having a 3.8" (96 mm) diameter which is 40" ($10^{16}$ mm) long tensioned, when under a force of 135 pounds-force (lbf) (600 N), was able to effectively resist telescoping potentially caused by the differential pressure forces that would be seen in a normal food or dairy application. An equation (Formula 2) is then used that relates ring force to pressure within a cylinder:

$$F = (p*D)/2 \qquad \text{Formula 2}$$

where
- F=force exerted on overwrap spacer when element is tensioned,
- p=pressure between membrane and feed spacer,
- D=diameter of element being tensioned.

Based upon the foregoing empirical determination for a 3.8 in (96 mm) diameter by 40 in (1,016 mm) long element, it has been found that tensioning forces can be calculated to be used for winding elements of different diameters so that they will effectively resist the internal forces that will be present during crossflow filtration/separation. From the above formula and the preferred tensioning forces that were empirically determined, it is calculated that the pressure between the feed spacer and the membrane, which is being effectively resisted, is about 1.5 lbf/$in^2$ (10,500 N/$m^2$). This information is used to determine minimum amounts of pressure that one should plan to resist by providing radial compression in the cartridge. Using all this information, it has now been determined that the tensioning force (F) used to wind elements of a diameter of 100 mm (3.94 in) would be at least about 1.7 lbf per inch of element length (304 N/m); however, preferably a force of at least about 2.8 lbf per inch of element length (500 N/m) and more preferably at least about 3 lbf/in (536 N/m) is used to assure there will be adequate radial compression. Whereas a 150 mm (5.9 in) diameter element will require a greater tensioning force of at least about 3.7 lbf/in (660N/m), and preferably at least about 5.6 lbf/in (1000N/m) is used. A 200 mm (7.88 in) diameter element will require a tensioning force of at least 5 lbf/in (890 N/m); preferably a force of at least about 6.2 lbf/in (1,00N/m) and more preferably at least about 7 lbf/in (1250 N/m) is used. Because the standard spirally wound elements are typically about 40 in (about 1 m) in length, the minimum force used for a 100 mm (3.94 in) diameter standard element is about 67 lbf (300 N).

To provide the necessary tension in winding these elements to create such desired radial compression, a special tensioning machine was designed. After the element is fabricated and the adhesive has cured, the element is placed on this tensioning machine. End-edge-trimming of each of the 3-ply leaves is performed so that the adhesively sealed ends of the sandwich of permeate carrier sheet between the membrane half sheets present end surfaces filled with solidified adhesive, and then the end portion of a roll of overwrap sheet material is thermally or sonically welded to one of the feed spacer leaves. The element is supported on a spindle and rotated to spirally wind the assembly of leaves. As the roll of overwrap sheet is being unrolled, it is maintained tensioned, and it thus applies tension about the assemblage of leaves and spacer sheets as several wraps of overwrap sheet material are wound around the element, radially compressing the spirally wound assemblage. As wrapping continues, the tension in the overwrap sheet material gradually increases until the desired tension level is reached therein; such tension is measured in the region between the supply roll and the spirally wound element. Then, while still maintaining this desired tension, the wrapping procedure is reversed; some of the overwrap sheet material is unwound from the element and re-rolled back onto the overwrap supply roll until the precise desired outside diameter of the wrapped element is reached. Two juxtaposed layers of the overwrap sheet material are then preferably thermally or ultrasonically welded to each other at a desired location along the entire length of the element to hold and maintain the desired radial compression within the element; following such welding, the overwrap sheeting is severed adjacent such location of the joined band and the element is removed from the tensioning machine.

The element is then inserted into the rigid shell to complete fabrication of the sanitary cartridge. The tight tolerance between the outside diameter of the element and the inside diameter of the shell, preferably between +0.050 in (1.3 mm) to −0.050 in (1.3 mm) diametrical clearance, insures that the element will not easily slide out of the shell or be capable of expanding inside the rigid shell. Its radial compression creates a cartridge that effectively resists telescoping.

If there is no need for a sanitary cartridge to conform strictly to USDA guidelines, i.e. no need for trimming the 3-ply membrane-permeate carrier fabric leaves so their end edge surfaces are adhesive-filled, the above procedure may be modified to save time and money. In such instance, the element can either be tensioned to the specifications as listed above during the rolling process, or it can be tensioned in a separate operation as described above while simply omitting the trimming of the 3-ply membrane-permeate carrier fabric leaves.

In one particular aspect, the invention provides a spiral-wound membrane cartridge, which cartridge comprises a central permeate collection tube, a plurality of sheets of semipermeable membrane filtration material folded about in half with their folds located near said central tube, a plurality of sheets of feed spacer material which are respectively located between the two halves of each folded filtration membrane sheet, a plurality of sheets of permeate carrier material, each of which is disposed between half-sheets of each two adjacent folded filtration membrane sheets, bands of adhesive located along both longitudinal side edges and the outer end edge of each permeate carrier sheet, which bands seal said permeate carrier sheet between said adjacent filtration membrane half-sheets to create 3-ply leaves wherein the only entry to said permeate carrier sheets is through said filtration membranes, said pluralities of feed spacer sheets, folded filtration membrane sheets and permeate carrier sheets being tightly wound under tension about said central permeate collection tube to create a spiral-wound assemblage, overwrap sheet material which is joined to one of said feed spacer sheets, which is tension-wrapped about said assemblage with a force of at least 1.7 lbf/in (300 N/m) to tighten said sheets in radial compression in juxtaposition with one another, and which provides at least about 1½ encircling wraps to create a substantially cylindrical element having a selected outer diameter within close tolerances, and a thin-walled tubular shell that is slidingly assembleable with said element to enclose same, being textured to provide a nonlinear flow path between said shell's outer surface and the pressure vessel cylindrical surface and thereby provide for controlled bypass of feed liquid in liquid separation operations.

In another particular aspect, the invention provides a method of making a spiral wound membrane cartridge, which method comprises the steps of providing a central permeate collection tube and a plurality of sheets of feed spacer material, permeate carrier material, and semipermeable membrane filtration material, said membrane filtration material sheets having a length about twice as long as said other sheets and being folded approximately in half, adhesively attaching each of said permeate carrier sheets between half-sheets of two different semipermeable membrane filtration sheets with bands of adhesive which extend along both longitudinal side edges of said permeate carrier sheet and across the free end edge thereof to create 3-ply leaves, disposing a feed spacer sheet between each two facing half-sheets of filtration membrane material, spirally wrapping said plurality of sheets about said central permeate collection tube to form an assemblage, following curing of said adhesive, partially unrolling said spiral wound assemblage and trimming each free end edge of the 3-ply leaves to provide an adhesive-filled end edge surface, affixing overwrap material sheeting to an end portion of one of said feed spacer sheets, tightly re-winding said plurality of sheets of said partially unrolled assemblage about said central permeate collection tube with said overwrap sheeting attached to one feed spacer sheet, while applying tension of at least 1.7 lbf/in (300 N/m) to said overwrap sheeting to thereby tighten the wrapped assemblage about said central permeate collection tube and place the assemblage of sheets in radial compression, jointing two juxtaposed regions of said overwrap sheeting to each other to retain the tightly wrapped final filtration element in substantially cylindrical form having a selected outer diameter, and associating a thin tubular shell having textured exterior surface with said tightly wrapped element to provide a filtration cartridge designed to allow a controlled bypass flow of liquid feed between a pressure vessel interior surface and said textured exterior surface of said shell.

In a further particular aspect, the invention provides a method of making a spiral wound membrane cartridge, which method comprises the steps of providing a central permeate collection tube and a plurality of sheets of feed spacer material, permeate carrier material, and semipermeable membrane filtration material, said membrane filtration material sheets having a length about twice as long as said other sheets and being folded approximately in half, adhesively attaching each of said permeate spacer sheets between half-sheets of two different semipermeable membrane filtration sheets with bands of adhesive which extend along both longitudinal side edges of said permeate carrier sheet and across the free end edge thereof and create 3-ply leaves, disposing a feed spacer sheet between each two facing half-sheets of filtration membrane material, spirally wrapping said plurality of sheets about said central permeate collection tube with a tension of at least 1.7 lbf/in (300 N/m) to provide an assemblage of sheets in radial compression, and associating a thin tubular shell having textured exterior surface with said tensioned assemblage to provide a filtration cartridge which allows a controlled bypass flow of liquid feed between a pressure vessel interior surface and said textured exterior surface of said shell.

DETAILED DESCRIPTION OF THE PREFERRED EMBODIMENTS

Figure 1:
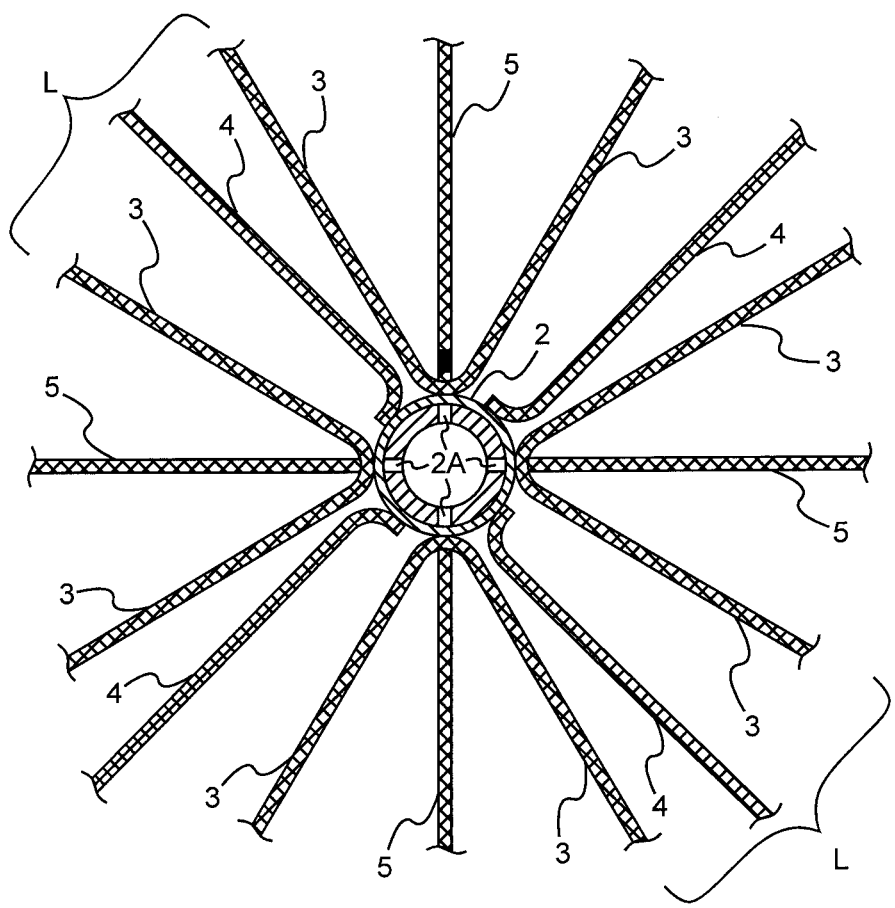
FIG. 1 is a cross-sectional view of a basic spiral wound element in its unwound condition.

U.S. Pat. No. 5,985,146 discloses a spiral wound semipermeable membrane filtration cartridge which has become well accepted in the food and dairy industries and in other processing operations that require sanitary conditions. Its disclosure is expressly incorporated herein by reference. The rigid outer shell is generally formed of a polymeric material such as polypropylene, polyethylene, polyvinyl chloride (PVC), acrylonitrile butadiene styrene (ABS), or polysulfone, and it can be held to close tolerances with respect to both inner diameter (ID) and outer diameter (OD). It has been found, however, that to ensure maximum effective performance of the filtration cartridge in such a production line product, it is important that there be a tight fit between the smooth cylindrical interior surface of the shell and the periphery of the cylindrical spiral wound element that is received therein. The close tolerance to which the textured outer surface of the shell can be held permits close control of the amount of bypass flow of feed liquid that will occur in this region. However, if a loose-fitting element is received inside the shell, such would provide an initial annular flow path that would undesirably increase the amount of bypass flow through the pressure vessel in which the cartridge is being used in a cross-flow filtration operation. Furthermore, as the lifetime of the cartridge grows, the spirally wound sheet materials tend to swell and would expand outward to fill such an outer region caused by the initial loose fit; such expansion can often result in the opening of axial passageways through regions of the spiral wound assemblage. The feed liquid would then have a tendency to preferentially flow through such openings and thus reduce performance because of lack of permeation through the membrane in such regions. In addition, a loose-fitting element may more easily slip out of the sanitary rigid shell during cartridge loading and unloading. To overcome these production difficulties and produce a tightly wound filtration element that has an outer surface which is substantially cylindrical and has a tolerance close to the ID of a shell, the method described hereinafter was developed.

Spiral wound filtration elements of semipermeable sheet material have been made for some four decades from assemblages of semipermeable membrane material sheets that are folded in half preparatory to the fold being located near the central porous permeate tube about which rolling will occur. The downstream surface of each half sheet or panel is then adhesively adhered so as to sandwich a sheet of permeate carrier material between it and a second half membrane sheet by applying two parallel bands of adhesive along its side edges and a perpendicular band of adhesive across the end edge creating a 3-ply leaf. A sheet of feed spacer material is placed between the facing upstream membrane surfaces of the folded membrane sheets of the two adjacent 3-ply leaves to complete the assemblage as depicted generally in FIG. 1, and tight spiral winding is then effected. Examples of such spiral wound, cross-flow semipermeable membrane filtration elements are shown, for example, in U.S. Pat. Nos. 3,417,870; 4,906,372; 5,108,604; 4,548,714 and 7,303,675, the disclosures of which are incorporated herein by reference.

Shown in the Figures of the '675 patent, for example, is an illustrative procedure for laying-up a spiral wound, cross-flow filtration element from semipermeable membrane sheet material. Although more or less leaves may be used than mentioned in that illustrative procedure and as shown in FIG. 1 of this application, the use of four folded sheets of semipermeable membrane material, four sheets of permeate carrier material and four sheets of feed spacer material provides an adequate basis for description. Following the application of adhesive, each half sheet of semipermeable membrane material sandwiches a sheet of permeate carrier material which lies between it and a second half sheet of semipermeable membrane material to form a three-ply leaf. Disposed between the four pairs of facing 3-ply leaves are the sheets of feed spacer material. Optionally, the inner end of one of the sheets of permeate carrier material can be of slightly added length so that the excess permeate carrier material extends from one sandwich and is initially wrapped around the porous permeate tube. With the assemblage arranged as shown in FIG. 1, spiral winding around the permeate tube takes place using controlled tension so as to create a tightly wound, generally cylindrical element.

For sanitary elements used in the food and dairy industry, for example, the adhesives that are used must have FDA approval, and some of the adhesives of choice are polyurethane or epoxy based adhesives which require some time to permanently cure. In order to use these preferred adhesives in spiral wound elements for the dairy and food industries, where the USDA also requires each of the three-ply leaves (i.e. the sandwiches of semipermeable membrane and carrier sheet material) to have an edge seal which is free of porous regions, it is necessary to trim the edge through the adhesive bond to provide a completely adhesive-filled end edge surface for these three-ply leaves. Such trimming cannot feasibly be performed until the adhesive has substantially completely cured; thus, to meet such USDA requirements, it has been found necessary to await complete curing of the adhesive, then partially unroll the spirally wound element sufficiently to expose the end edges of each of these three-ply sandwiches, and appropriately trim each edge to provide the required adhesive-filled end edge surface. Thereafter, of course, the assemblage must be rewound.

In some applications where strict conformance to USDA specifications is not required; for instance for dairy, food, and pharmaceutical applications in the European Union, it is not required that the 3-ply membrane-permeate carrier fabric leaves be trimmed so that the end edge surfaces are filled with adhesive. Such allows the above procedure to be modified to save time and money. The element can be tensioned instead during the rolling process to meet desired specifications, or it can be tensioned in a separate operation without the requirement of trimming of the 3-ply membrane-permeate carrier fabric leaves. In place of joining or securing the sheeting overwrap to itself, tape could be used to hold the tensioned element tight prior to its insertion into the rigid shell and removed during the insertion process into the rigid shell.

It was found that this trimming and tensioning operation provided an opportunity to improve the spiral wound element to consistently provide an element that (1) is truly tightly wound and will remain so during its normal lifetime, (2) is substantially cylindrical having an OD of close tolerance with the ID of the thin shell in which it will be received, and (3) has a thin peripheral region that exhibits substantial resistance to bypass flow axially therethrough.

To achieve the foregoing objectives, an overwrap sheet material is chosen which is of a character that is substantially opposite to that of the feed spacer material. A wide variety of feed spacer materials have been utilized over the years; generally they are referred to as separator grid material and are designed to provide low resistance, axial flow passageways through the spiral wound elements. See, for example, U.S. Pat. Nos. 4,902,417; 4,500,426; and 4,225,438. As shown in the '417 patent, it was often desirable to use feed spacer materials of woven filaments or having other arrangements where two groups of parallel filaments are arranged perpendicular to each other and bonded to one another at their intersections. In the latter instances, the filaments are often preferentially sized so that the larger filaments run in the direction parallel to the axis of the spiral wound element so as to provide axial flow passageways therethrough without undesirable pressure drops. These feed spacers typically lack the tensile strength required for use as a tensioning overwrap; thus, it was necessary to look for a different material to use as the tensioning overwrap.

It has now been found that, by using overwrap sheet material of an opposite construction to that of the feed spacer material wherein the larger filaments extend in the direction circumferentially of the element and the smaller filaments extend in the axial direction, two advantages are obtained.

Such overwrap sheet material will permit the application of greater tensioning force to tightly rewrap the assemblage to create a substantially cylindrical exterior surface and an element that is truly tightly wound. The overwrap spacer is normally a netting material, extruded from polypropylene or polyethylene, which is between 0.020 in (0.5 mm) and about 0.08-0.09 in (2-2.3 mm) in thickness; it should have a tensile strength of at least 7 lbf/in (1,310 N/m), preferably at least about 8 lbf/in (1,500 N/m) and more preferably at least about 10 lbf/in (1,800 N/m). It is also desirable that the overwrap spacer have a greater resistance to cross flow within the element than the feed spacer. Both the feed spacer sheet material and the overwrap sheeting material are often made of two groups of spaced apart parallel strands, with the strands of each group being arranged substantially perpendicular to those of the other group. The groups of strands are preferably bi-planar in the feed spacer material; by biplanar is meant that each of the strands in one group lies in a plane contiguous with the plane of the other group. The strands in the overwrap sheeting material are preferably of a planar arrangement. This creates the desirable effect of minimizing feed flow through the overwrap material, i.e. around the outside of the element, and consequently forcing more feed flow through the feed spacer channel material. Standard woven materials would be one example of a planar material.

The rewinding procedure can be carried out by first applying multiple wraps of the overwrap material to achieve the tightness desired; the overwrap is then unrolled while maintaining tension, until a substantially cylindrical surface is obtained having a diameter within close OD tolerance. Then the overwrap sheeting is severed at an appropriate location. The application of such tensioning forces is made possible by the use of overwrap sheet material having substantially greater tensile strength in its longitudinal direction, e.g. because the larger diameter or other dimension filaments are arranged in the circumferential direction. By substantially greater is meant a tensile strength at least about 20 percent greater. Moreover, there is an added benefit that the circumferential orientation of the thicker fibers in the thin peripheral region will deter substantial bypass flow of the liquid being subjected to filtration; thus, the amount of bypass that is closely controlled by the texture of the exterior surface of the shell is not significantly increased.

FIG. 1 shows the basics of a spiral wound element 1 in its unwound form. This includes a perforated permeate tube 2 having a plurality of openings 2a which allow the permeate to exit from the leaves at the center of the element. Illustrated as a simple example are four folded membrane sheets 3, four feed spacer sheets 5, and four permeate carrier sheets 4, one of which is longer and wraps about the permeate tube 2. The membrane may be any type of semipermeable membrane, e.g. microfiltration, ultrafiltration, nanofiltration, or reverse osmosis. These membranes may be made as a composite using a polyester or polypropylene woven or non-woven support fabric, on top of which a layer is coated from a solution of polymer, typically polysulfone, polyethersulfone, cellulose acetate, polyacrylonitrile, or other suitable polymers to create ultrafiltration or microfiltration membranes. To create reverse osmosis or nanofiltration membranes, such an ultrafiltration membrane, typically one made from polysulfone or polyethersulfone, will be coated with a layer of polyamide material via an interfacial polymerization reaction.

The feed spacer sheet 5 is typically a netting material made from polypropylene or polyethylene consisting of bi-planer strands that intersect at approximately 90 degree angles. These spacer sheets range in thickness from 0.028 in (0.71 mm) to 0.090 in (2.3 mm); they function to maintain a feed space between two facing panels of a folded membrane sheet, while also helping to promote turbulent flow of the feed liquid. The permeate carrier sheet 4 is used to create a conduit for flow of the permeate water to the central permeate tube 2. The permeate carrier fabric is typically a knit fabric having channels aligned in the radial direction as depicted in FIG. 1. The fabric is typically coated with a thermoset resin, e.g. an epoxy, to give it the required strength to withstand the force of a high pressure feed solution, e.g. up to 1,000 psi (70 bar). Such is contrasted with the pressure of the permeate solution, typically around 10 psi (0.7 bar).

The membrane panels 3 are bonded to a sheet of the permeate carrier fabric 4 using a two part polyurethane or epoxy adhesive to create a sandwich therewith forming a 3-layer leaf L (FIG. 1). The strips of adhesive create a seal preventing feed solution from entering the permeate carrier fabric 4 without permeating the membrane 3. The adhesive is applied in strips along the two side edges and across the end edge away from the permeate tube 2. No adhesive is applied along the edge of the sandwich which lies adjacent to the permeate tube 2.

In normal operation, a pressurized feed solution enters the spirally wound feed spacer sheets 5 and travels axially through the element, flowing along the membrane panels 3. A portion of the feed solution permeates the membrane 3 where the separation occurs. The permeate passing through the membrane 3 travels spirally radially inward along the permeate carrier fabric 4, passes through the holes 2a in the permeate tube 2, and then exits from one or both ends of the permeate tube 2. The element would typically be operated within a tubular pressure vessel where O-ring seals would interconnect the permeate tube with suitable adapters and allow passage of permeate out one or both end closures of the pressure vessel.

Figure 2A:
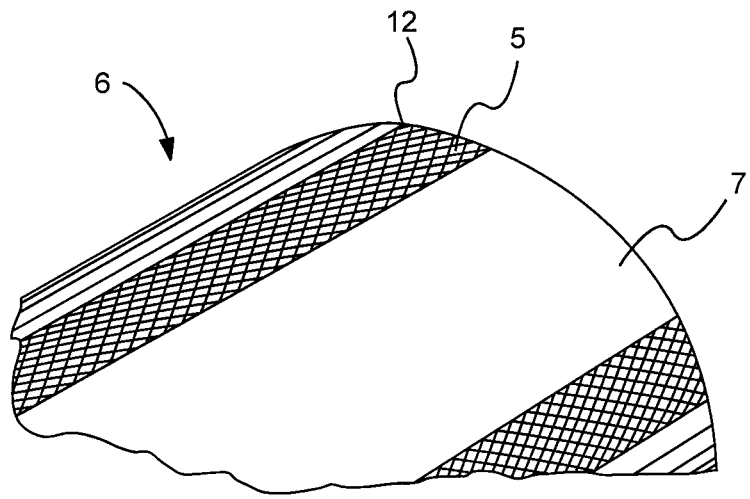
FIG. 2A is a fragmentary perspective view, enlarged in size, showing details of element leaves after unwinding of the element and trimming.
Figure 2:
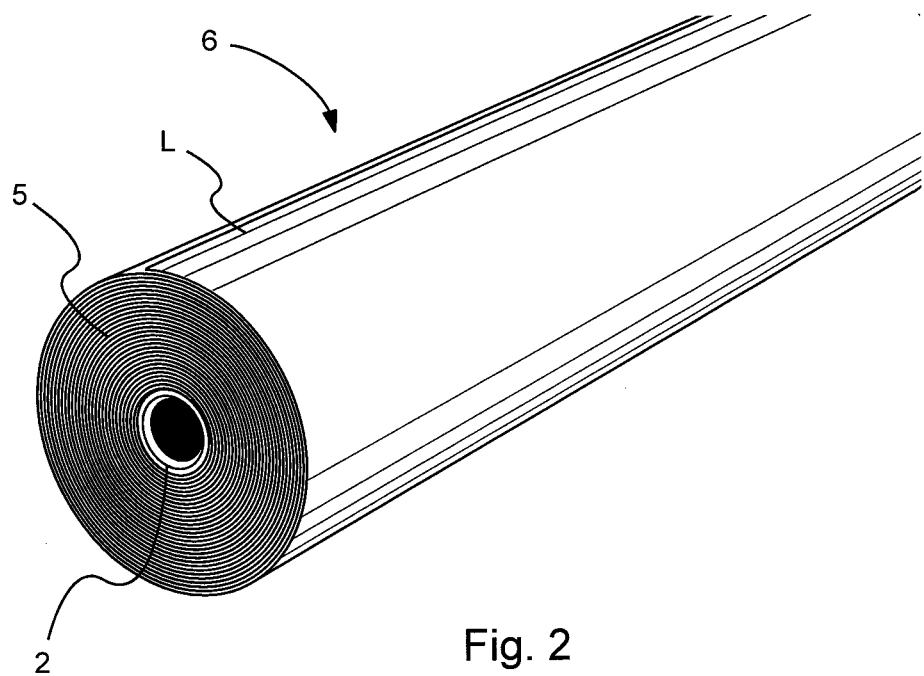
FIG. 2 is a perspective view of a partially finished spiral wound element.

FIG. 2 shows a partially completed, rolled spiral wound element 6. The element would typically have a diameter of 3.8 in (96 mm) to 4 in (102 mm) when rolled using four 3-ply membrane leaves as depicted in FIG. 1. Larger diameter elements may be made, e.g. of 6.3 in (150 mm), or 7.88 in (200 mm) diameters, by typically adding additional of such membrane leaves. Such a spiral wound element 6 comprising a central permeate tube 2, feed spacer sheets 5, and a plurality of 3-ply leaves L of two membrane sheets 3 adhesively bonded with a permeate carrier sheet 4 as a sandwich is normally assembled using special equipment to wind up all these sheet materials around the permeate tube 2 and apply the adhesive. To hold this assembly together, some form of tape is generally applied to the exterior surface of the rolled element to maintain this shape until the adhesive has cured.

Figure 3:
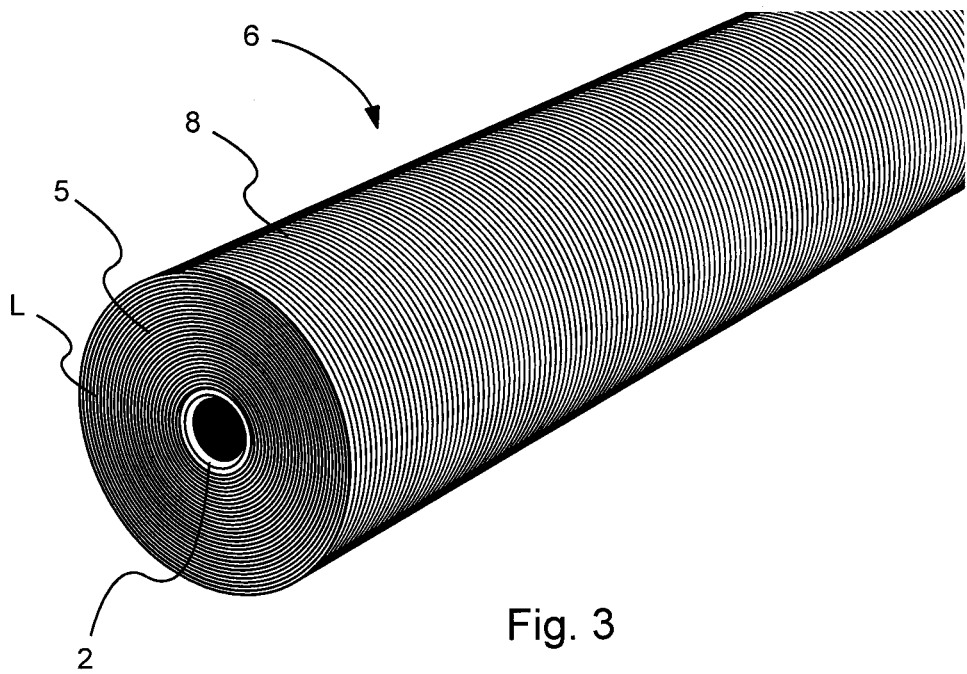
FIG. 3 is a perspective view of the spiral wound element of FIG. 2 with a spacer sheeting outerwrap.

FIG. 3 shows the addition of overwrap material 8 to a partially completed spiral wound element 6 such as that shown in FIG. 2. An overwrap 8 is applied to the outside of the element after the tape has been removed, as the presence of tape is not viewed as sanitary by the USDA. An overwrap 8, typically made from polyethylene or polypropylene and having the appearance of a netting material is FDA-approved. For the present invention, an overwrap of sheet material 8 is chosen that is of sufficient tensile strength to allow its tensioning at a level of at least about 7.0 lbf/in (1,250N/m) and preferably at a level of at least about 8.0 lbf/in (1,425 N/m). It is also desirable that the overwrap sheeting be chosen to have a substantially higher resistance to cross flow therethrough (i.e. axially of the spirally wound element) than the feed spacer 5, so that the flow of feed solution is preferentially through the feed spacer 5 material rather than through the overwrap spacer 8. By-pass flow is undesirable because it detracts from efficiency because only flow through the feed spacer is able to permeate the membrane 3, and high flow rates here promote desirable turbulence in the feed spacer material 5. By substantially higher resistance is meant a ΔP of at least about 1.5 times greater and preferably at least about 3 times greater.

After the element is initially rolled and the adhesive has been allowed to cure, the element 6 is usually partially unwound to allow for trimming the ends of 3-ply leaves L at locations which are referred to as the end seals 12. These end seals 12 of the leaves, where the two sheets of membrane 3 sandwich the permeate carrier sheet 4, should present an end surface that is filled with adhesive. Per USDA rules, there must be no end flaps of membrane 3 or permeate carrier sheet 4 that is not fully bonded with adhesive. Such is accomplished by partially unwinding the element 6 and cutting through the adhesive-filled region at the end seal. FIG. 2A shows details after the trimming of the partially completed element 6 of FIG. 2 has taken place. Each leaf of feed spacer material 5 is shown as extending slightly beyond the trimmed end 12 of the adjacent 3-ply membrane-permeate carrier leaf L, the end edge surface of which leaf is filled with adhesive. However, such an operation creates two problems. Once the tension of the element is relieved during the unwinding process, uniformity may be difficult to achieve upon rewinding, and the finished outside diameter of the re-rolled element will vary depending on how much is trimmed off at each of the end seals.

Figure 5:
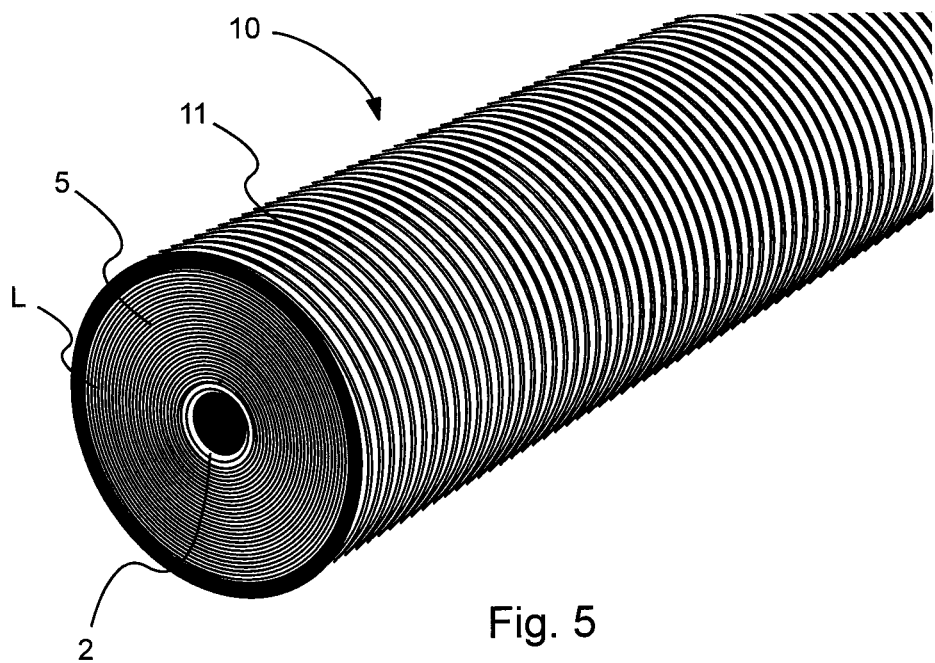
FIG. 5 is a schematic view of the sanitary cartridge with the element of FIG. 3 assembled inside the shell.

A re-rolled element might be simply inserted into a pressure vessel without any surrounding restraint, as depicted in FIG. 5 of the '714 patent. However, overwrap sheeting 8 is preferably used as depicted in FIG. 3, and such may be held in place by thermally or ultrasonically welding the overwrap sheeting 8 to itself. In some embodiments, the element shown in FIG. 3 could function as a complete element, and it might be sold as a sanitary filtration element. Negative characteristics of such an arrangement would be the likelihood that a fairly high percentage of feed solution might by-pass around the outside of the element and the lack of any mechanical structure that should withstand the forces present in these elements tending to cause deformation of the element during filtration operation, as described in more detail in columns 1 and 2 of the '146 patent.

Figure 4:
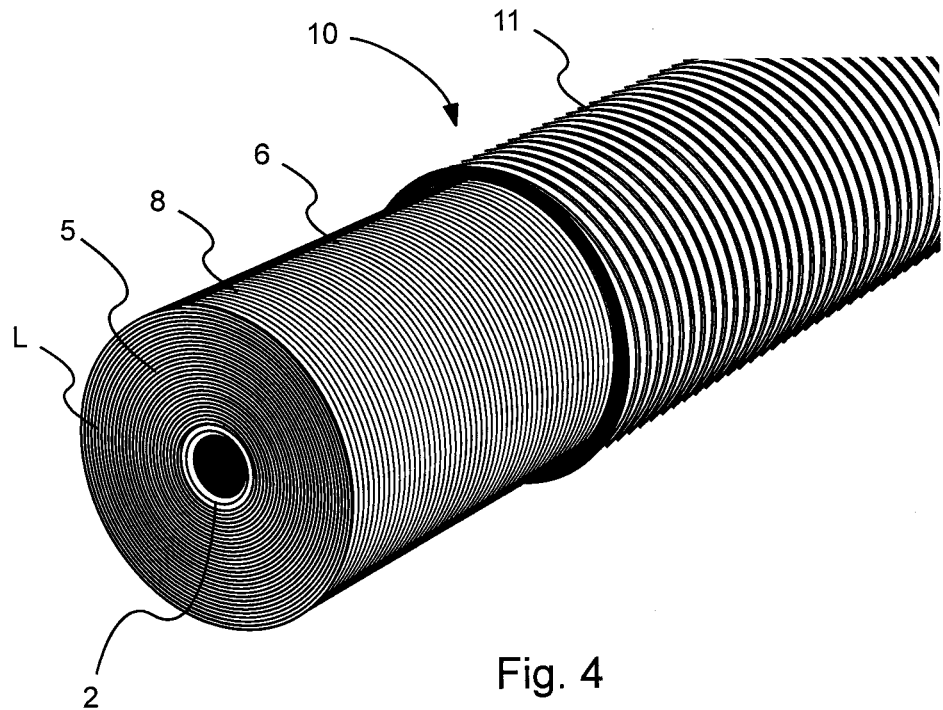
FIG. 4 is a perspective view of the spiral wound element of FIG. 3 being inserted into a shell.

Such problems are overcome when a trimmed and tensioned element 6 of precise outer diameter is provided for insertion into a machined sleeve or shell 11 as shown in FIG. 4 to create a spiral wound, sanitary, filtration cartridge 10. When the tolerances of the outside diameter of the trimmed and tensioned element 6 are precisely held so that the clearance is minimal between the inside of the rigid shell 11 and the cylindrical surface of the element 6, preferably between +0.050 in (1.3 mm) to −0.050 in (1.3 mm) diametrical clearance, a superior completed sanitary cartridge 10 results, and the radial compression of the assemblage effectively resists telescoping. Such a properly dimensioned element is shown within the sanitary shell 11 in FIG. 5.

Figure 6:
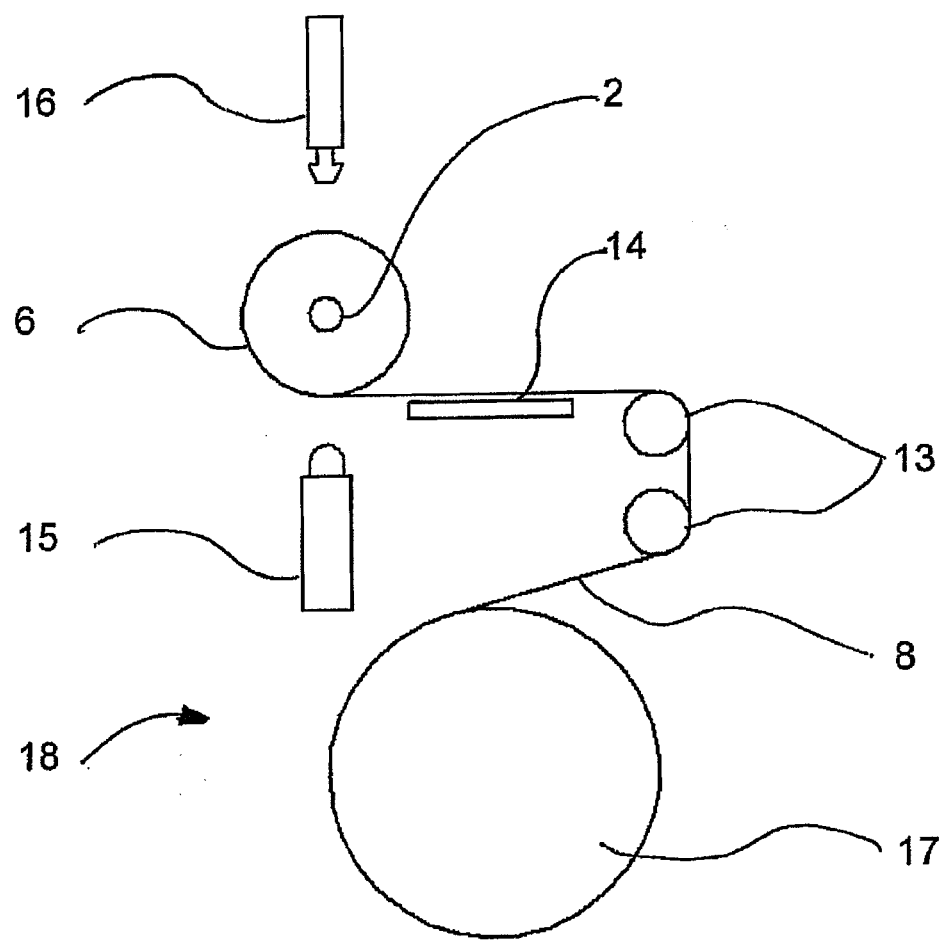
FIG. 6 is a schematic view of tensioning equipment that may be used to create the desired tension within a spiral wound element of precise outer diameter.

FIG. 6 schematically shows a tensioning machine 18 which is used to partially unwind the element 6 after the adhesive has cured, trim the end seals 12, and then tension the element and size it to the proper outside diameter. The partially finished, rolled spiral wound element 6, as shown in FIG. 2, is placed on the tensioning machine 18. Chucks are inserted into both ends of the permeate tube 2 to support and rotate the element 6. A reciprocating pressure bar 15 is applied to hold the tension on the wound element. The temporary tape wrap that has held the element together is removed, and the element 6 is partially unwound to sequentially expose each of the four membrane leaves L. After the first membrane leaf 7 (FIG. 2A) is placed on the platen 14 and trimmed through the end seal adhesive line, the element 6 is rotated to expose the next membrane leaf L, and its end seal is trimmed. This procedure is repeated until all the end seals 12 of all four membrane leaves L have been trimmed.

The attachment of the overwrap sheet material to the assemblage is preferably done by joining the end region of a roll 17 of such sheet material to one of the feed spacer sheets at a location near the ends of both. If both the feed spacer sheet material and the overwrap sheet material are made of thermoplastic polymeric materials, such joinder can be carried out by heat sealing, i.e. thermal or ultrasonic welding. Otherwise, a suitable adhesive is preferably used; for example, a hot melt adhesive or an epoxy or polyurethane based adhesive or any other suitable, relatively quick-setting adhesive may be used that is FDA-approved. The overwrap sheet material is wound about the assemblage, for example, for four to eight complete wraps to ensure the desired tightness. Depending on the element diameter, the tightness should be at least about 1.7 lbf/in (304 N/m) and more preferably at least about 3 lbf/in (540 N/m) and generally need not be greater than in the range of about 5.6 lbf/in (890 N/m) to about 8 lbf/in (1400 N/m). Because the selected feed spacer sheet is radially compressed to some extent for the major portion of its length within the tightly spirally wound assemblage, it is able to withstand the tension in the overwrap sheet material.

Then, the overwrap material is unwrapped to such an extent that the OD of the element falls within close tolerance of the ID of the shell, preferably between +0.050 in (1.3 mm) to −0.050 in (1.3 mm) diametrical clearance. Following unwrapping, the element should still have at least 1½ encircling wraps, and preferably will have three or more wraps. The desired end region of the overwrap material is then joined, e.g. secured, to the next surface layer thereof, and the overwrap sheeting roll is then severed at the joint to complete the production of the spiral wound element. Such securing may be done by interconnection of the juxtaposed layers along a band of suitable width that extends across the length of the overwrap material by thermal or ultrasonic welding of polymeric material or by using a suitable adhesive as above indicated. The tension in the overwrap material in the element that is inserted into the shell of the cartridge maintains the spirally wrapped assemblage in radial compression.

An illustrative overall operation is now described in connection with FIG. 6, after the end seal trimming has occurred. The end of a roll 17 of overwrap sheeting 8 is thermally welded to the end of one of the feed spacer sheets 5 across its entire width using a thermal welder 16. A motor connected to the drive chuck then rotates the permeate tube and the leaves of the element and wraps them with several layers of overwrap sheeting 8 from main overwrap roll 17, which sheeting travels around guide rollers 13. The overwrap sheeting roll 17 is tensioned during this operation, to between at least about 1.7 lbf/in (300 N/m) and about 8 lbf/in (1430 N/m) and preferably to between about 2.8 lbf/in (500 N/m) and about 7 lbf/in (1250 N/m) depending on the element diameter. For a nominal 4" diameter element, a tension of at least about 2.8 lbf/in (500 N/m) is preferably used, whereas for a nominal 8.0" diameter element, at least about 7 lbf/in (1250 N/m) is preferably used.

Several wraps of the overwrap sheeting 8, usually at least 4 and not more than 6 to 8 wraps, are wound around the element from main roll 17; this assures the desired uniform tension is achieved throughout the spirally wound assemblage. Once this step has been completed, overwrap sheeting is slowly unwound back onto main overwrap roll 17 while maintaining this tension in the sheeting until the desired outside diameter is precisely obtained. Rotation is then stopped, and pressure bar 15 is extended to maintain such tension in the wrapped element. The thermal welder 16 is extended from its diametrically opposite location and the overwrap sheeting is welded to itself. The sheeting is severed at the weld, and the wrapped element is ready to be removed from tensioning machine 18 and inserted into rigid shell 11 as shown in FIG. 4.

The overall result is the creation of a production line operation for fabricating spiral wound filtration elements that are not only substantially cylindrical but have ODs which can be held to close tolerance. Thus, the finished element can be readily inserted into a thin shell 11 of textured exterior surface, e.g. one having helical grooves along its entire length, in which it will be snugly received. The resultant sanitary cartridge 10 consistently exhibits optimum performance wherein bypass flow is essentially controlled by the textured outer surface within the pressure vessel with only very minimal bypass flow occurring through the thin peripheral region of the overwrap material.

Example 1

A 6.3 in (160 mm) diameter by 40 in (1 m) long element was rolled using 12 folded leaves of TriSep UE10 polyethersulfone ultrafiltration membrane, 12 leaves of Delstar 0.031 in (0.79 mm) thick with 9 strands per inch (3.5 strands per cm) style 14592 feed spacer, and 12 leaves of 0.012 in (0.30 mm) thick epoxy-coated tricot permeate carrier sheeting. Winding is carried out around a polysulfone permeate tube with an OD of about 1.68 in (42.7 mm), and a two part polyurethane adhesive is used for the side and end seals. The wound element was secured using adhesive tape. After allowing the urethane adhesive to cure for 12 hours, the element was placed onto a tensioning machine as depicted in FIG. 6. The end seals were trimmed, and then the end of a roll of overwrap sheet material was attached using a thermal sealer. The overwrap material is a polypropylene netting material with a thickness of 0.031 in (0.79 mm). The element was tensioned to 5.6 lbf/in (1,000N/m) while winding seven wraps of overwrap sheet around the outside of the element. The element was then unwound until the outside diameter was 6.07 in (154.2 mm) within a tolerance of +/−0.05 in (1.3 mm). The element was inserted into a rigid polypropylene shell on the outside of which a helical groove was machined to provide a separation cartridge. This cartridge was placed into a pressure vessel for operation of a 35% whey protein dairy plant. Bypass flow through the pressure vessel in which the cartridge was installed was measured and found to be about 35% lower than that of a previously installed net-wrapped element, resulting in a 35% savings in recirculation flow energy. In addition, the permeate production from the cartridge was 20% higher than the previously installed cartridge which included a net-wrapped element.

Example 2

Two 7.9 in (201 mm) diameter by 40 in (1 m) long elements were rolled using 18 folded leaves of TriSep ACM2 polyamide reverse osmosis membrane, 18 leaves of Delstar 0.031 in (0.79 mm) thick with 9 strands per inch (3.5 strands per cm) style 14592 feed spacer, and 18 leaves of 0.012 in (0.30 mm) thick epoxy-coated tricot permeate carrier. A polysulfone permeate tube with an OD of about 1.68 in (42.7 mm) and a two-part polyurethane adhesive were used. The wound elements were secured using adhesive tape.

After allowing the urethane adhesive to cure for 12 hours, one element was placed onto a tensioning machine as seen in FIG. 6. The end seals were trimmed, and then overwrap sheeting was attached using a thermal sealer as in Example 1. The overwrap material was a woven fabric which was made from polypropylene and had a thickness of 0.031 in (0.79 mm). The element was tensioned to 6.2 lbf/in (1,100N/m), while winding five complete wraps of overwrap sheet around the outside of the element. The element was then unwound until the outside diameter was 7.64 in (194 mm)+/−0.05 in (1.3 mm). This one element was inserted into a rigid polypropylene shell on the outside of which helical grooving was machined.

The second element had its end seals trimmed while maintaining the normal tension present therein as a result of the initial winding process, but it was not subsequently tensioned on the FIG. 6 machine. It was simply wrapped manually with three bands, one on each end and one in the middle, of adhesive tape, which tape was removed as the second element was inserted into its shell.

Both cartridges were tested on cross flow filtration of a 2000 ppm solution of sodium chloride at 225 psi (15.5 bar), 77° F. (25° C.), as single elements with about 15% recovery. The cartridge containing non-tensioned element exhibited a permeate flow of 9,582 gallons per day (36.3 m³/day) at 99.25% salt rejection. The cartridge containing the tensioned element exhibited a permeate flow of 10,250 gpd (38.8 m³/day) at 99.60% rejection. These tests were repeated, and the cartridge including the tensioned element consistently exhibited significantly higher salt rejection and slightly higher permeate flow. The higher salt rejection was surprising and is felt to be a result of more uniform flow through the element which has favorable boundary layer effects.

Example 3

Two 7.9 in (201 mm) diameter by 40 in (1 m) long elements were rolled using 18 folded leaves of TriSep ACM2 polyamide reverse osmosis membrane, 18 leaves of Delstar 0.031 in (0.79 mm) thick, with 9 strands per inch (3.5 strands per cm) style 14592 feed spacer, and 18 leaves of 0.012 in (0.30 mm) thick epoxy-coated tricot permeate material. A polysulfone permeate tube of OD about 1.68 in (42.7 mm) in and a two-part polyurethane adhesive were used. The wound elements were secured using adhesive tape. After allowing the urethane adhesive to cure for 12 hours, one element was placed onto the tensioning machine of FIG. 6. The end seals were trimmed, and then an overwrap sheeting was attached using a thermal sealer as in Example 1. The overwrap sheeting was a polyproylene netting material with a thickness of 0.031 in (0.78 mm). The element was tensioned to 7.0 lbf/in (1,250N/m) while winding seven complete wraps of overwrap sheet around the outside of the element. The sheeting was then unwound until the outside diameter was 7.64 in (194 mm)+/−0.05 in (1.3 mm). The element was inserted into a rigid polypropylene shell on the outside of which helical grooving was machined to provide a sanitary cartridge. The second element had its end seals trimmed while maintaining the normal tension present during the winding process, but it was not subsequently tensioned before being overwrapped with netting material. Both elements were tested at a feed brine at a high temperature of about 176° F. (80° C.) and an inlet pressure of about 225 psi (15.5 bar). The differential pressure end to end of the element was about 60 psi (4 bar) and the test was run for 15 minutes. The non-tensioned element exhibited telescoping of the netting material out the end of the cartridge and also underwent expansion inside the shell, creating several void spaces within the element that were 0.25 in (6.4 mm) to 0.50 in (12.8 mm) in size. The cartridge that included the tensioned element did not exhibit any such telescoping or internal expansion and provided superior results.

Although the invention has been described with regard to certain preferred embodiments, changes and modifications as would be obvious to one of ordinary skill in this art may be made without departing from the scope of the invention which is set forth in the claims appended hereto. For example thermal or ultrasonic welding is meant to include all varieties of heat-sealing. Particular features of the invention are emphasized in the claims that follow.

The invention claimed is:

1. A method of making a spiral wound membrane cartridge of about 7.9 in. diameter for a sanitary application, which method comprises the steps of:
   providing a central permeate collection tube and a plurality of sheets of feed spacer material, permeate carrier material, and semipermeable membrane filtration material, said membrane filtration material sheets each having a length about twice as long as said other sheets and being folded approximately in half,
   adhesively attaching each of said permeate carrier sheets between half-sheets of two different semipermeable membrane filtration sheets along both longitudinal side edges of said permeate carrier sheet and across the free end edge thereof to create 3-ply leaves,
   disposing a feed spacer sheet between each two facing half-sheets of different filtration membrane material, which feed spacer sheet is of bi-planar construction and formed of two groups of parallel filaments,
   spirally wrapping said plurality of sheets about said central permeate collection tube to form an assemblage,
   following curing of said adhesive, partially unrolling said spiral wound assemblage and trimming a free end edge of each of the 3-ply leaves to provide an adhesive-filled end edge surface,
   affixing overwrap material sheeting to an end portion of one of said feed spacer sheets which feed spacer sheet is juxtaposed in surface to surface contact with facing membrane filtration sheets within said spiral wound assemblage, said overwrap material sheeting having a substantially greater tensile strength than the feed spacer, which greater tensile strength is at least about 1250 N/m in the longitudinal direction,
   tightly re-winding said plurality of sheets of said partially unrolled assemblage about said central permeate collection tube with said overwrap sheeting attached to one feed spacer sheet to create several wraps of overwrap sheeting around the spiral wound assemblage, while applying gradually increasing tension to at least 7 lbf/in (1250 N/m) to said overwrap sheeting to thereby tighten the wrapped assemblage about said central permeate collection tube and place the assemblage of sheets in radial compression,
   joining two juxtaposed regions of said overwrap sheeting to each other in surface to surface contact to retain the resultant tightly wrapped final filtration element in substantially cylindrical form having a selected outer diameter, and
   associating a thin tubular shell having a textured exterior surface with said tightly wrapped element to provide a filtration cartridge designed to allow a controlled bypass flow of liquid feed between a pressure vessel interior surface and said textured exterior surface of said shell.

2. The method according to claim 1 wherein said overwrap sheeting is wrapped about said assemblage for at least about four total wraps while applying said tension to provide the desired tightness in said element and then slightly unwrapped to an extent which provides a precise selected outer diameter before joining said overwrap sheeting to itself and severing said sheeting adjacent said joint.

3. The method according to claim 2 wherein said overwrap material, which is joined to an end portion of one of said feed spacer sheets, encircles said assemblage at least about 1½ times in the tightly wrapped final filtration element.

4. The method according to claim 1 wherein said feed spacer sheet and said overwrap sheeting are made of thermoplastic polymeric materials and are joined via heat-sealing and wherein said adhesive is a two-part epoxy or polyurethane adhesive.

5. The method according to claim 1 wherein said feed spacer sheet material and said overwrap sheeting material are each made of two groups of spaced apart parallel strands which groups are arranged substantially perpendicular to each other and wherein the two groups of strands are bi-planar in said feed spacer material and that the two groups of strands in said overwrap sheeting material have a planar arrangement.

6. A method of making a spiral wound membrane cartridge of about 7.9 in. diameter for a sanitary application, which method comprises the steps of:
   providing a central permeate collection tube and a plurality of sheets of feed spacer material, permeate carrier material, and semipermeable membrane filtration material,
   attaching each of said permeate carrier sheets between two sheets of semipermeable membrane filtration material along both longitudinal side edges of said permeate carrier sheet and across a free outer end edge thereof with a curable adhesive to create 3-ply leaves,
   disposing a feed spacer sheet between each two 3-ply leaves, which feed spacer sheet is of bi-planar construction and formed of two groups of parallel filaments,
   spirally wrapping said plurality of feed spacer sheets and 3-ply leaves about said central permeate collection tube to form an assemblage,
   partially unrolling said spiral wound assemblage following curing of said adhesive,
   affixing overwrap material sheeting to an end portion of one of said feed spacer sheets in said partially unrolled assemblage, which feed spacer sheet is juxtaposed in surface to surface contact with facing membrane filtration sheets within said spiral wound assemblage, said overwrap material sheeting having a planar construction which has an at least about 1.5 times higher resistance to cross flow therethrough than the bi-planar feed spacer sheet and which has a tensile strength of at least about 1250 N/m in the longitudinal direction that is greater than the tensile strength of the feed spacer sheet,
   then tightly re-winding said partially unrolled assemblage about said central permeate collection tube with said overwrap sheeting affixed to one feed spacer sheet to create several wraps of overwrap sheeting around the spiral wound assemblage, while applying gradually increasing tension to at least 7 lbf/in (1250 N/m) to said overwrap sheeting, to thereby tighten the wrapped assemblage containing said cured adhesive about said central permeate collection tube with multiple encircling wraps of said overwrap material and place the assemblage of sheets in radial compression,
   unwrapping said tightened wrapped assemblage while maintaining said tension until a precise outer diameter is reached and then joining two juxtaposed regions of said overwrap sheeting to each other in surface to surface contact to retain the resultant tightly wrapped final filtration element in substantially cylindrical form having said precise outer diameter, and associating a thin tubular shell having a textured exterior surface with said tightly wrapped element to provide a filtration cartridge designed to allow a controlled bypass flow of liquid feed between a pressure vessel interior surface and said textured exterior surface of said shell.

7. The method according to claim 6 wherein said overwrap sheeting is wrapped about said assemblage for at least about four total wraps while applying said tension to provide the desired tightness in said element.

8. The method according to claim 7 wherein said overwrap material sheeting is severed at a location such that said overwrap material, encircles said assemblage at least about 1½ times in the tightly wrapped final filtration element of precise outer diameter.

9. The method according to claim 6 wherein said feed spacer sheet and said overwrap sheeting are made of thermoplastic polymeric materials and are joined via heat-sealing and wherein said adhesive is a two-part epoxy or polyurethane adhesive.

* * * * *